United States Patent
Abou-Rizk et al.

(10) Patent No.: US 10,306,419 B2
(45) Date of Patent: May 28, 2019

(54) DEVICE LOCATING USING ANGLE OF ARRIVAL MEASUREMENTS

(71) Applicant: ABL IP Holding LLC, Conyers, GA (US)

(72) Inventors: Mitri J. Abou-Rizk, Newton, MA (US); Sajin George, Somerville, MA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

(21) Appl. No.: 15/719,870

(22) Filed: Sep. 29, 2017

(65) Prior Publication Data
US 2019/0104384 A1 Apr. 4, 2019

(51) Int. Cl.
*H04W 24/00* (2009.01)
*H04W 4/04* (2009.01)
(Continued)

(52) U.S. Cl.
CPC .............. *H04W 4/04* (2013.01); *G01S 5/06* (2013.01); *H04W 4/023* (2013.01)

(58) Field of Classification Search
USPC .............. 455/442–446, 456.1–456.3, 457; 370/328–333
See application file for complete search history.

(56) References Cited

U.S. PATENT DOCUMENTS 6,174,073 B1   1/2001   Regan et al.
6,583,573 B2   6/2003   Bierman
(Continued)

FOREIGN PATENT DOCUMENTS

EP   3111566 A2   1/2017
WO   0158098 A2   8/2001
(Continued)

OTHER PUBLICATIONS

Benkic et al., "Using RSSI value for distance estimation in wireless sensor networks based on ZigBee", Conference paper, Jul. 2008—https://www.researchgate.net/publication/4364297—5 pages.
(Continued)

*Primary Examiner* — Dai Phuong
(74) *Attorney, Agent, or Firm* — RatnerPrestia

(57) ABSTRACT

The disclosure provides examples of systems and methods for determining locations of a number of radio frequency-enabled devices such as mobile devices and radio frequency-equipped beacons/luminaires within an indoor location. The radio frequency-enabled devices may be part of an indoor positioning system and/or content delivery system. The examples describe obtaining an angle of arrival (AoA) of the signals received by the respective radio frequency-enabled devices. The AOA data is used to identify the relative positions of the radio frequency-enabled devices as the mobile device moves about the indoor location. Upon comparing AOA measurements of the collected data related to a map of the location, the system may generate a data structure that may be presented graphically as a map of positions of the devices at the location. The described examples may enable a rapid commissioning process with respect to the radio frequency-enabled devices in a network.

12 Claims, 9 Drawing Sheets

(51) Int. Cl.
*G01S 5/06* (2006.01)
*H04W 4/02* (2018.01)

(56) References Cited

U.S. PATENT DOCUMENTS

| | | | |
|---|---|---|---|
| 6,891,838 B1 | 5/2005 | Petite et al. | |
| 7,045,968 B1 | 5/2006 | Bierman et al. | |
| 7,103,511 B2 | 9/2006 | Petite | |
| 7,307,542 B1 | 12/2007 | Chandler et al. | |
| 7,970,537 B2 | 6/2011 | Ann et al. | |
| 8,013,732 B2 | 9/2011 | Petite et al. | |
| 8,035,529 B2 | 10/2011 | Veskovic et al. | |
| 8,049,434 B2 | 11/2011 | Crouse et al. | |
| 8,124,948 B2 | 2/2012 | Haumann et al. | |
| 8,159,156 B2 | 4/2012 | Henig et al. | |
| 8,193,729 B2 | 6/2012 | Liao | |
| 8,260,575 B2 | 9/2012 | Walters et al. | |
| 8,373,362 B2 | 2/2013 | Chemel et al. | |
| 8,422,401 B1 | 4/2013 | Choong et al. | |
| 8,457,793 B2 | 6/2013 | Golding et al. | |
| 8,463,130 B2 | 6/2013 | Ma et al. | |
| 8,477,690 B2 | 7/2013 | Khoryaev et al. | |
| 8,520,065 B2 | 8/2013 | Staats et al. | |
| 8,536,802 B2 | 9/2013 | Chemel et al. | |
| 8,587,225 B2 | 11/2013 | Ashar et al. | |
| 8,594,221 B2 | 11/2013 | Chen et al. | |
| 8,729,808 B2 | 5/2014 | Knibbe et al. | |
| 8,731,689 B2 | 5/2014 | Platner | |
| 8,760,262 B2 | 6/2014 | Veskovic | |
| 8,796,951 B2 | 8/2014 | Feri et al. | |
| 8,796,958 B2 | 8/2014 | Billig et al. | |
| 8,810,359 B2 | 8/2014 | Campbell et al. | |
| 8,823,277 B2 | 9/2014 | Chemel et al. | |
| 8,841,865 B2 | 9/2014 | Kim et al. | |
| 8,909,380 B2 | 12/2014 | Golding et al. | |
| 8,912,735 B2 | 12/2014 | Chobot et al. | |
| 8,928,232 B2 | 1/2015 | Aggarwal et al. | |
| 8,947,513 B2 | 2/2015 | Ganick et al. | |
| 8,964,016 B2 | 2/2015 | Ganick et al. | |
| 8,975,827 B2 | 3/2015 | Chobot et al. | |
| 8,994,295 B2 | 3/2015 | Mohan et al. | |
| 8,994,799 B2 | 3/2015 | Ganick et al. | |
| 8,994,814 B2 | 3/2015 | Ganick et al. | |
| 9,041,296 B2 | 5/2015 | Yianni et al. | |
| 9,055,200 B1 | 6/2015 | Ganick et al. | |
| 9,072,133 B2 | 6/2015 | Chemel et al. | |
| 9,084,215 B2 | 7/2015 | Honkanen et al. | |
| 9,167,668 B1 | 10/2015 | Fitzmaurice | |
| 9,192,019 B2 | 11/2015 | Huizenga et al. | |
| 9,192,028 B2 | 11/2015 | Walma et al. | |
| 9,253,860 B2 | 2/2016 | Wang | |
| 9,288,878 B2 | 3/2016 | Dillen | |
| 9,326,358 B2 | 4/2016 | Campbell et al. | |
| 9,345,115 B2 | 5/2016 | Mohan | |
| 9,426,868 B2 | 8/2016 | Dau | |
| 9,432,966 B2 | 8/2016 | Kalliola et al. | |
| 9,439,096 B2 | 9/2016 | Josiam et al. | |
| 9,451,678 B2 | 9/2016 | Simons et al. | |
| 9,480,131 B1 | 10/2016 | Thorn | |
| 9,497,832 B2 | 11/2016 | Verberkt et al. | |
| 9,509,402 B2 | 11/2016 | Ryan et al. | |
| 9,510,426 B2 | 11/2016 | Chemel et al. | |
| 9,521,724 B1 | 12/2016 | Berry et al. | |
| 9,585,227 B2 | 2/2017 | Mohan et al. | |
| 9,684,059 B2 * | 6/2017 | Sung | G01S 5/02 |
| 9,711,047 B1 | 7/2017 | Knas et al. | |
| 9,711,048 B1 | 7/2017 | Knas et al. | |
| 9,721,451 B1 | 8/2017 | Knas et al. | |
| 9,741,237 B1 | 8/2017 | Knas et al. | |
| 9,877,266 B1 | 1/2018 | Knas et al. | |
| 9,877,298 B1 | 1/2018 | Knas et al. | |
| 9,881,484 B1 | 1/2018 | Knas et al. | |
| 9,949,091 B1 | 4/2018 | Knas et al. | |
| 9,955,559 B2 | 4/2018 | Engelen et al. | |
| 9,984,556 B1 | 5/2018 | Knas et al. | |
| 2002/0013129 A1 | 1/2002 | Davies | |
| 2007/0060098 A1 | 3/2007 | McCoy | |
| 2007/0066323 A1 * | 3/2007 | Park | G01S 5/02 455/456.2 |
| 2009/0240752 A1 * | 9/2009 | Jenson | G06F 15/0275 708/131 |
| 2010/0257195 A1 * | 10/2010 | Inoue | G01C 21/3602 707/769 |
| 2010/0323723 A1 | 12/2010 | Gerstenberger et al. | |
| 2013/0188538 A1 | 7/2013 | Kainulainen et al. | |
| 2015/0188682 A1 | 7/2015 | Noh et al. | |
| 2015/0350839 A1 | 12/2015 | Syrjarinne et al. | |
| 2016/0014873 A1 | 1/2016 | Bello et al. | |
| 2016/0033616 A1 * | 2/2016 | Sen | H04W 64/00 455/456.5 |
| 2016/0142868 A1 * | 5/2016 | Kulkarni | H01Q 1/24 455/456.5 |
| 2016/0234703 A1 | 8/2016 | Aldana et al. | |
| 2016/0234704 A1 | 8/2016 | Aldana et al. | |
| 2016/0327631 A1 | 11/2016 | Salokannel et al. | |
| 2016/0366548 A1 | 12/2016 | Wang et al. | |
| 2016/0374182 A1 | 12/2016 | Newton et al. | |
| 2016/0381762 A1 | 12/2016 | Leclerc et al. | |
| 2017/0005860 A1 | 1/2017 | Tan et al. | |
| 2017/0018128 A1 | 1/2017 | Berezin et al. | |
| 2017/0041071 A1 | 2/2017 | Ryan et al. | |
| 2017/0070893 A1 | 3/2017 | Wang et al. | |
| 2017/0147877 A1 * | 5/2017 | Bostick | G06F 17/3028 |
| 2017/0238191 A1 * | 8/2017 | Bahl | H04B 7/0617 370/329 |
| 2018/0073951 A1 * | 3/2018 | Venkatraman | H04W 4/023 |
| 2018/0219869 A1 * | 8/2018 | Kumar | H04W 12/12 |
| 2018/0249306 A1 * | 8/2018 | Pandharipande | H04Q 9/00 |

FOREIGN PATENT DOCUMENTS

| | | |
|---|---|---|
| WO | 2007110791 A1 | 10/2007 |
| WO | 2015140000 A1 | 9/2015 |
| WO | 2015148562 A1 | 10/2015 |
| WO | 2016016435 A1 | 2/2016 |
| WO | 2016023733 A1 | 2/2016 |
| WO | 2016036991 A1 | 3/2016 |
| WO | 2016075107 A1 | 5/2016 |
| WO | 2016138549 A1 | 9/2016 |
| WO | 2016150798 A1 | 9/2016 |
| WO | 2016209069 A1 | 12/2016 |
| WO | 2017036848 A1 | 3/2017 |
| WO | 2017036998 A1 | 3/2017 |

OTHER PUBLICATIONS

Gu et al., "A survey of indoor positioning systems for wireless personal networks", IEEE Communications Surveys & Tutorials, vol. 11, No. 1, First Quarter 2009—pp. 13-32.

European Search Report for European Application No. 18196457.8 dated Feb. 25, 2019, 10 pages.

Peng et al., "Angle of Arrival Localization for Wireless Sensor Networks," downloaded Nov. 19, 2009, 9 pages.

* cited by examiner

410 — Receive a signal transmitted from a mobile device at each of a number of stationary radio frequency-enabled beacons 420 — Obtain an angle of arrival of the received signal at each respective stationary radio frequency-enabled beacon of the number stationary radio frequency-enabled beacons 430 — Identify positions of each of the stationary radio frequency-enabled beacons relative to the mobile device based on the obtained angle of arrival of the signal received from the mobile device 440 — Generate an identified position map including the number of stationary radio frequency-enabled beacons using the identified positions of the stationary radio frequency-enabled beacons

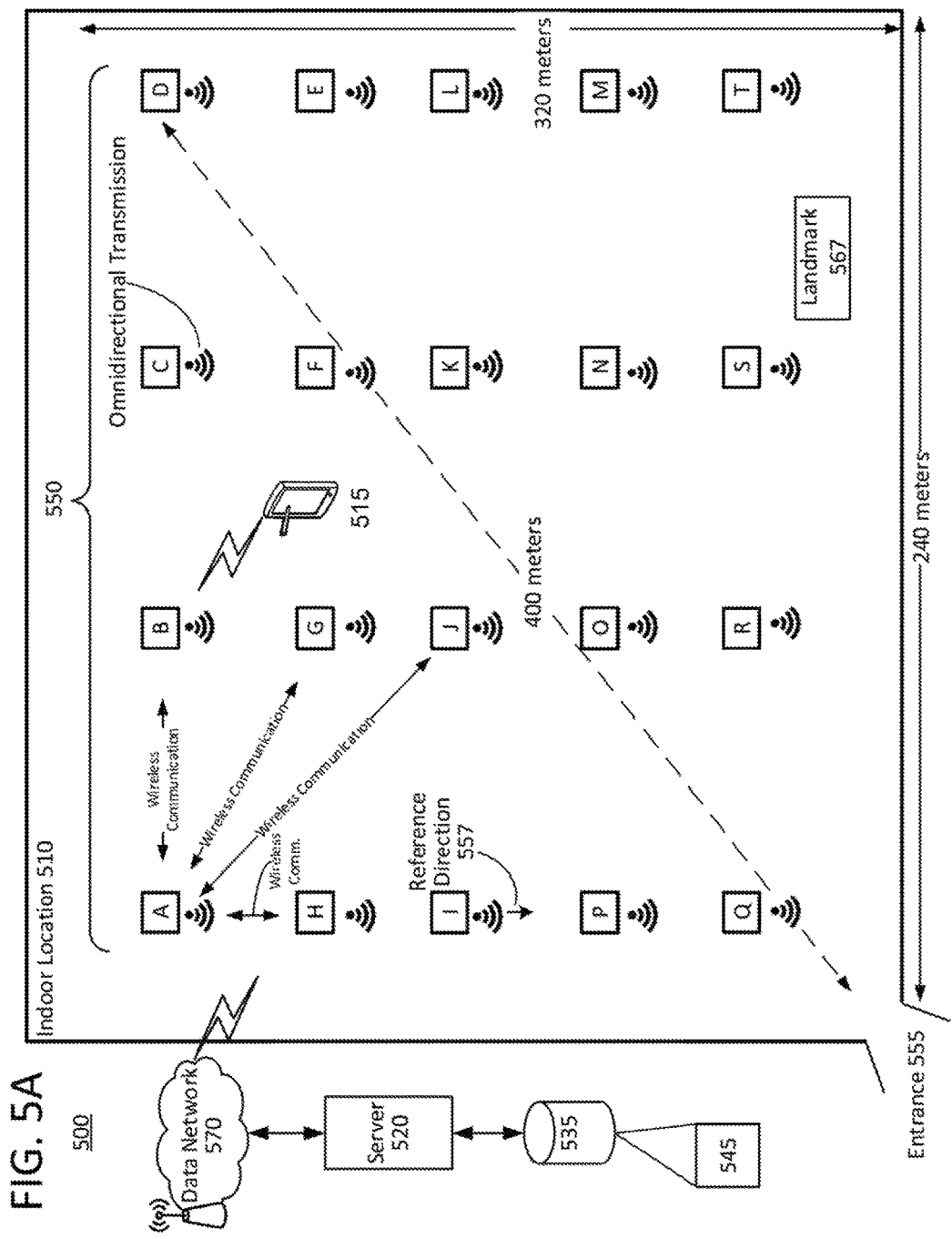

610 — Receive a respective signal from each of a number of stationary radio frequency-enabled beacons 620 — Obtain an angle of arrival of each respective signal received from each respective stationary radio frequency-enabled beacon of the number of stationary radio frequency-enabled beacons 630 — Identify positions of each of the stationary radio frequency-enabled beacons relative to the radio-frequency-enabled device that received the respective signals based on the obtained angle of arrival of each respective signal received from each respective stationary radio frequency-enabled beacon 640 — Generate an identified position map including the number of stationary radio frequency-enabled beacons using the identified positions of the stationary radio frequency-enabled beacons

710 — Receive, by the respective radio frequency-enabled beacon, respective signals from a number of the other stationary radio frequency-enabled beacons 720 — Obtain, by a processor coupled to the radio frequency-enabled beacon, an angle of arrival of each respective signal received from each respective stationary radio frequency-enabled beacon of the number of the other stationary radio frequency-enabled beacons by the respective radio frequency-enabled beacon 730 — Identify positions of the other stationary radio frequency-enabled beacons in the indoor location relative to the radio-frequency-enabled beacon based on the obtained angle of arrival of each respective signal received from each respective stationary radio frequency-enabled beacon of the other stationary radio frequency-enabled beacons 740 — Generate a location map using the identified positions of the stationary radio frequency-enabled beacons in the indoor location

DEVICE LOCATING USING ANGLE OF ARRIVAL MEASUREMENTS

TECHNICAL FIELD

The present subject matter relates to methods, systems and apparatuses that provide an improved indoor position determination utilizing angle of arrival measurements performed with a lighting device and/or other radio frequency-enabled devices within the indoor location. The angle of arrival measurements are performed using radio frequency signals within an indoor location, a part of which is illuminated by the lighting device.

BACKGROUND

Indoor positioning systems enable a user's mobile device position to be determined within an indoor location based on measurements relative to known communication equipment. Some indoor positioning systems may use radio frequency devices throughout an indoor location. However, lighting devices are also used in indoor positioning systems. For indoor positioning service, the luminaires may transmit information via modulated light and/or communicate with a mobile device via radio frequency transceivers included in the luminaires. When used in an indoor positioning system, the location of the luminaire within an indoor location allows for a more accurate indoor position determination since the location of the luminaires are typically fixed according to an installation plan.

However, there may be times when luminaires are not installed according to the installation plans. For example, luminaires may be installed out of position due to a measurement error, installation error or the like. If the installation error affects position determination, allowing the installation error to perpetuate may have adverse effects on not only the position determination but also the user's experience with the positioning system as well as any business or event operating in the indoor location.

The light fixture position map or installation map may typically be presented in blueprints generated via computer-aided drafting software. Such mapping requires specialized software executed by a computer to render the map on a full-scale monitor or the like and/or update information, such as position information, in the light fixture position map or installation map.

Alternatively or additionally, indoor surveying techniques are applied to determine the precise locations of the RF-enabled luminaires in the ceiling. However, these indoor surveying techniques may require complicated devices, such as a theodolite, laser ranging devices, or the like, that may require specialized training and be time-consuming to operate to obtain the required measurements.

In addition, position determination functionality may be useful in commissioning of devices for use in an indoor positioning system, such as light fixtures in a lighting-based RF indoor positioning system. However, present commissioning systems and processes are labor-intensive and time-consuming. For example, present commissioning systems and processes require a commissioning system operator to stand with a portable device directly under each luminaire in a facility to confirm the light fixture's identity and location. These prior RF-based commissioning techniques typically take a number of days to complete a commissioning process in a large retail establishment from a light map (due to the large number of light fixtures) because each fixture to be commissioned has to be addressed individually and in turn Furthermore, these prior RF-based commissioning techniques do not enable the generation of a representation of the locations of the light fixtures, for example, via a graphical display of the locations of the luminaires within a premises.

SUMMARY

Hence, there is room for further improvement in a determining locations of radio frequency-enabled devices used to implement an indoor positioning system within indoor location.

An example of a method includes receiving, by three radio frequency-enabled devices located within an indoor location of which at least one of the three radio frequency-enabled devices is configured as a luminaire, a radio frequency signal transmitted by a mobile device within the indoor location, the radio frequency signal including a mobile device identifier. Each of the three radio frequency-enabled devices receive the radio frequency signal at a respective array of antennas. A processor of each respective one of the three radio frequency-enabled devices obtains an angle of arrival indication determined based on the radio frequency signal received via the array of antennas of the respective one of the three radio frequency-enabled devices. The processors of the three radio frequency-enabled devices forward the obtained angles of arrival indications to a server. The server obtains mobile device location information related to a location of the mobile device in the indoor location. The server determines a distance from the mobile device to each respective one of the respective three radio frequency-enabled devices based on the mobile device location information, a respective known height above a floor of the indoor location of each respective one of the three radio frequency-enabled devices, and the obtained angle of arrival indications. A data structure including locations of each of the three radio frequency-enabled devices relative to one another and relative to the location of the mobile device within the indoor location is generated using the angle of obtained arrival indications and determined distances.

An example of a system is also disclosed. The system includes a number of radio frequency-enabled devices, a server, and a data storage. The number of radio frequency-enabled devices are located within an indoor location, and each of the plurality of radio frequency-enabled devices configured to communicate in a network. The server is coupled to the number of radio frequency-enabled devices, and is configured to receive from each radio frequency-enabled device of the number of radio frequency-enabled devices position determination information and identifying information related to each of the number of radio frequency-enabled devices. The data storage is coupled to the server, and is configured to store the received position determination information and the identifying information related to each of the plurality of radio frequency-enabled devices. Each respective radio frequency-enabled device of the number of radio frequency-enabled devices includes: a processor, a radio frequency transceiver and a memory. The memory and the radio frequency transceiver are coupled to the processor, and the memory stores programming code executable by the processor. The processor, upon executing the stored programming code, being configured to obtain an angle of arrival indication of the received signal upon receiving a signal from another radio frequency-enabled device of the plurality of radio frequency-enabled devices. The processor obtains position determination information of the other radio frequency device from the received signal. The position determination information may include information related to a height of the other radio frequency device. Based on the obtained angle of arrival indication and the position determination information, the processor generates position related information of the respective radio frequency-enabled device; and forwards a message including a radio frequency-enabled device identifier of the respective radio frequency-enabled device and the position related information of the respective radio frequency-enabled device within the indoor location to the server.

Another method is also disclosed. The disclosed method includes receiving a signal from each of a number of stationary radio frequency-enabled beacons by a radio frequency-enabled device. A processor coupled to the radio frequency-enabled device obtains an angle of arrival of each respective signal received from each respective stationary radio frequency-enabled beacon of the number of stationary radio frequency-enabled beacons. The processor identifies positions of the stationary radio frequency-enabled beacons in the indoor location relative to the radio-frequency-enabled device based on the determined angle of arrival of each respective signal received from each respective stationary radio frequency-enabled beacon; and generates a location map using the identified positions of the number of stationary radio frequency-enabled beacons in the indoor location, the generated location map illustrating locations of the number of stationary radio frequency-enabled beacons relative to one another in the indoor location.

Yet another method is also disclosed. Each radio frequency-enabled beacon of a number of stationary radio frequency-enabled beacons within an indoor location receives by the respective radio frequency-enabled beacon respective signals from other stationary radio frequency-enabled beacons of the number of stationary radio frequency-enabled beacons within an indoor location. A processor coupled to the respective radio frequency-enabled beacon obtains an angle of arrival of each respective signal received from each stationary radio frequency-enabled beacon of the number of the other stationary radio frequency-enabled beacons by the respective radio frequency-enabled beacon. Positions of the other stationary radio frequency-enabled beacons in the indoor location are identified relative to the respective radio-frequency-enabled beacon based on the obtained angle of arrival of each respective signal received from each stationary radio frequency-enabled beacon of the other stationary radio frequency-enabled beacons. A location map is generated using the identified positions of the other stationary radio frequency-enabled beacons in the indoor location.

Another system example is also disclosed. This system example includes a location server and a number of station radio frequency-enabled devices. Each of the stationary radio frequency-enabled devices includes a radio frequency transceiver, a processor, and a memory. The memory being accessible by the processor, and configured to store program instructions. Each respective stationary radio frequency-enabled device of the plurality of stationary radio frequency-enabled devices being configured, when the respective processor of each respective stationary radio frequency-enabled device executes the programming instructions stored in the memory, to perform functions, including functions to receive, by the respective stationary radio frequency-enabled device, signals from other stationary radio frequency-enabled devices of the plurality of stationary radio frequency-enabled devices; obtain, by a processor coupled to the respective stationary radio frequency-enabled beacon, an angle of arrival of each respective signal received from each of the other stationary radio frequency-enabled beacons; and transmit the obtained angle of arrival of each of the respective signal received from each of the other stationary radio frequency-enabled beacons to the server. The location server is configured to receive the transmitted angle of arrival obtained for each of the respective signal received from each of the other stationary radio frequency-enabled beacons; identify positions of the other stationary radio frequency-enabled beacons in the indoor location relative to the respective radio-frequency-enabled beacon based on the obtained angle of arrival of each respective signal received from each respective one of the other stationary radio frequency-enabled beacons; and generate a location map using the identified positions of the stationary radio frequency-enabled beacons in the indoor location.

BRIEF DESCRIPTION OF THE DRAWINGS

The drawing figures depict three implementations in accord with the present teachings, by way of example only, not by way of limitation. In the figures, like reference numerals refer to the same or similar elements.

FIG. 4A is a flowchart of an example of a process usable within the example of an indoor location shown in FIG. 3.

FIG. 5A illustrates another example of an indoor location in which a number of RF beacons/luminaires perform a position determination process amongst themselves.

FIG. 6 is a flowchart of an example of a process for determining locations of stationary RF beacons/luminaires that communicate with one another within an indoor location, such as the example shown in FIG. 5A.

FIG. 7 is another flowchart of an example of another process for determining locations of stationary RF beacons/luminaires that communicate with one another within an indoor location, such as the example shown in FIG. 5A.

DETAILED DESCRIPTION

Figure 1:
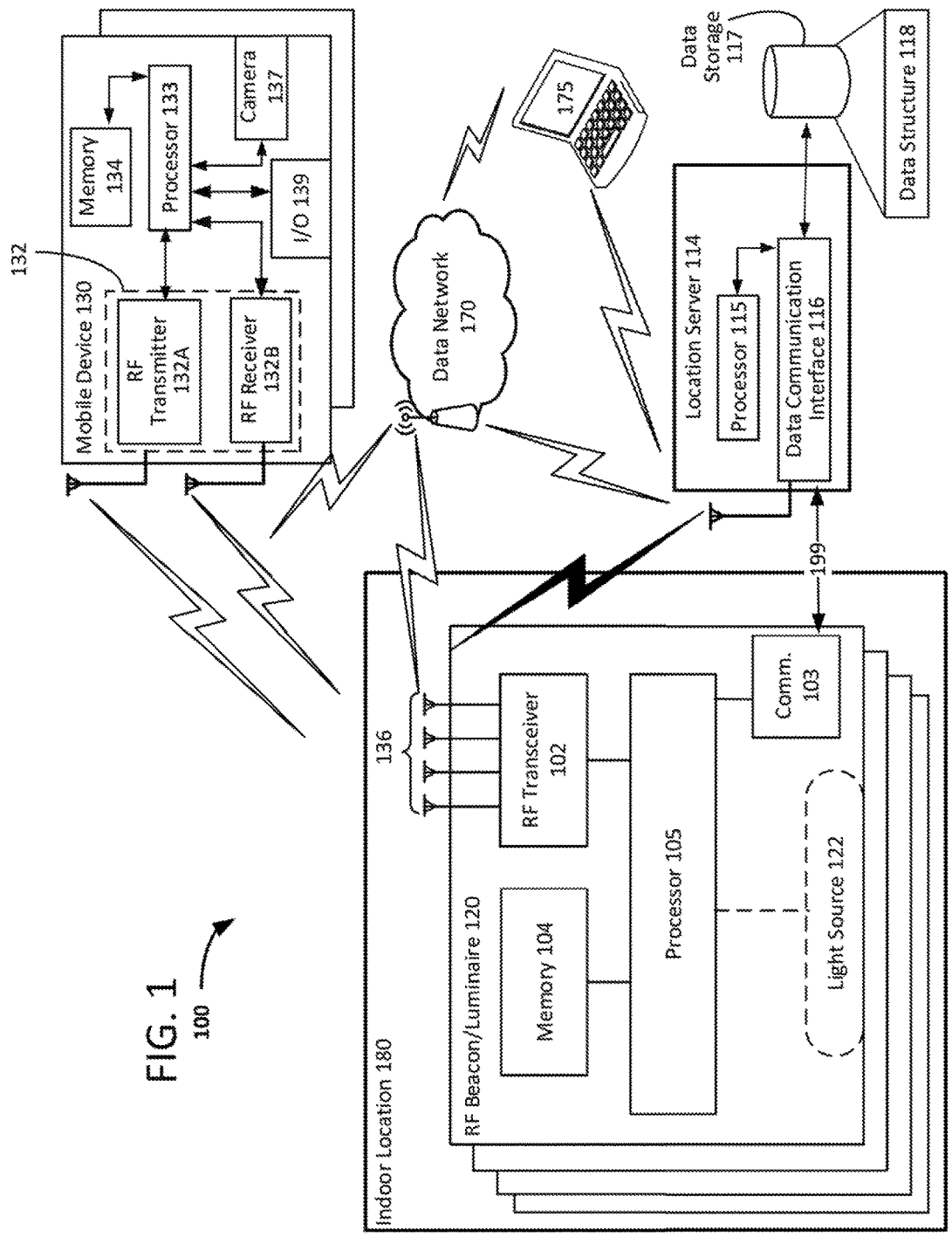
FIG. 1 illustrates a system in which RF beacon/luminaires and other devices function to perform a position determination process.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

To overcome the labor intensive commissioning process of addressing individual devices to be commissioned, it would be helpful if multiple devices could be commissioned without having to individually address multiple individual devices to be commissioned, and also using the relative positions of other network devices determined to be commissioned in a network.

In addition, it would be beneficial if systems, such as those described in more detail below, generated a data structure that included location information for the respective devices within an indoor location. The generated data structure enables the graphical presentation of the location information stored in the data structure on a display device of a portable device.

Luminaires (e.g. light fixtures, floor or table lamps, or other types of lighting devices for artificial illumination) are widely used in various residential, commercial and industrial settings for providing illumination in both interior and exterior spaces. For example, a retail store may install multiple luminaires in the ceiling for illuminating products and walking area throughout store. The luminaires discussed in the examples may be installed or otherwise located in or about a particular indoor location. Although the indoor location may be a single property and associated building structure, the term indoor location is used in the examples to also encompass installations and/or operations of the luminaires at more than a single site or building, such as a block or a campus. The system, however, can scale further to larger environments, for example, to application at the level of a city, a state, etc.

The term "luminaire" as used herein is intended to encompass essentially any type of device that processes power to generate light, for example, for illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition light for an organism. A luminaire, for example, may take the form of a table lamp, ceiling light fixture or other lighting device that incorporates a source, where the source by itself contains no intelligence or communication capability (e.g. LEDs or the like, or lamp ("regular light bulbs") of any suitable type). In most examples, the luminaire(s) illuminate a service area to a level useful for a human in or passing through the space, e.g. regular illumination of a room or corridor in a building or of an outdoor space such as a street, sidewalk, parking lot or performance venue. A luminaire may have other lighting purposes, such as signage for an entrance or to indicate an exit.

Reference now is made in detail to the examples illustrated in the accompanying drawings and discussed below. FIG. 1 illustrates a system diagram in which RF beacon/luminaires and other devices function to perform a position determination process.

The system 100 includes a number of RF beacons/luminaires 120, a mobile device 130, a data network 170, a computing device 175, a location server 114 and a data storage 117. The data storage 117 may store a data structure 118 in which may be stored data related to one more of the number of RF beacons/luminaires 120. Alternatively or in addition, the data structure 118 may be stored in the mobile device 130 memory 134, or the memory 104 of one or more of the number of RF beacons/luminaires 120. The system 100 may be located within an indoor location 180; or only some components, such as the RF beacons/luminaires 120, may be located within the indoor location 180 as shown by way of example in the drawing. The example relates to an arrangement in which luminaires are RF enabled, however, aspects related to position determination may be applied in systems in which RF beacons are standalone devices or implemented in other types of devices instead of or in addition to luminaires. The RF beacons/luminaires 120 therefore are also more generally referred to as radio frequency (RF)-enabled devices throughout the specification and claims. An example of the indoor location 180 is described in more detail with reference to FIG. 3.

The example of mobile device 130 includes an RF transmitter 132A, an RF receiver 132B, a processor 133, a user input/output (I/O) interface 139, a memory 134 and camera 137. The RF transmitter 132A and RF receiver 132B may be coupled to separate antennas or a single antenna. In addition, the RF transmitter 132A and RF receiver 132B may be combined as an RF transceiver 132, which may be coupled to a single antenna or an antenna array. The radio frequency signals transmitted and received by the respective RF transmitter 132A and RF receiver 132B (e.g., a mobile device transceiver 132) are compliant, for example, with the Bluetooth low energy specification. Of course, the transmitted signals may be compliant with other radio frequency communication protocols such as IEEE 802.11, Zigbee or the like. The camera 137 collects image data from the environment in which the mobile device 130 is located. The user I/O 139 may enable a user to interact with the mobile device 130 in order to input data, retrieve data and communicate with RF-enabled devices, such as RF beacons/luminaires 120, the location server 114 or computer 175. The mobile device I/O 139 may include one or more of a touchscreen display, a display device, a keyboard, track ball, joystick, speaker, microphone, other input and output devices or the like. Similarly, the computer 175 may include a display device and user interface structures, such as a keyboard, touchscreen, trackpad, mouse or the like.

When implemented as a luminaire, each RF beacon/luminaire 120 includes a light source 122. The actual light source in each luminaire 120 may be any type of artificial light emitting unit. Examples of artificial light sources include light emitting diodes (LEDs), incandescent or fluorescent lamps, halogen or halide lamps, neon tubes, or the like.

In the examples, the RF beacons/luminaires 120 also have processing capabilities. For example, the RF beacons/luminaires 120 may include a processor as well as radio frequency (RF) transceiver to perform communication with other luminaires and other wireless devices (e.g. mobile devices, assets to be tracked, etc.). A specific luminaire example of RF beacon/luminaire 120 as shown in FIG. 1 includes a light source 122, a processor 105, a power management unit 104, a communication port 106 and an RF transceiver 102. Although shown as one combined unit, the elements of the luminaire may be implemented somewhat separately, e.g. with the light source of a luminaire separated from but controlled by an associated processor of the luminaire. Alternatively, one processor may control some number of light sources and RF transceiver(s) at diverse locations about an indoor location. When implemented as only an RF beacon, the RF beacon/luminaire 120 omits the light source 122, but also includes a processor 105, a power management unit 104, a communication port 106 and an RF transceiver 102.

In the examples of FIG. 1, the RF beacon/luminaire 120 is shown as having at least one processor 105, for convenience. In some instances, such a luminaire may have multiple processors. For example, a particular configuration may utilize a multi-core processor architecture. Also, some of the other components, such as the communications interfaces 103, may themselves include processors. Alternatively, the processor 105 and associated memory 104 in the luminaire may be components of a Micro-Control Unit (MCU), which is a microchip device that incorporates a processor serving as a programmable central processing unit (CPU) as well as three of memories. The MCU may be thought of as a small computer or computer-like device formed on a single chip.

The system 100 includes a location server 114. The location server 114 has a communication link 103 for data communication with circuitry and/or programming of the luminaire 120. It should be noted that the electronic components of RF beacon/luminaire 120 may be powered by various electrical sources including a power source, such as a power supply coupled to mains power at the location 180, a battery or a solar panel.

The RF transceiver 102 may be implemented using a variety of wireless radio frequency transceiver technologies. Examples of RF wireless transceivers include Bluetooth transceivers, WiFi transceivers, 900 MHz (sub-GHz) wireless transceivers, ultra-wideband (UWB) transceivers, etc. In an example, the RF beacon/luminaire 120 may utilize as RF transceiver 102 a Bluetooth low energy (BLE) transceiver that conforms to the Bluetooth wireless communication standard. The radio frequency signals transmitted by the RF transceiver 102, in such an example, are compliant with the Bluetooth low energy specification. The RF transceiver 102 may be configured with an array of antennas 136. The array of antennas 136 enable measurement of angle of arrival (AoA) and angle of departure (AoD) of received signals as will be explained in more detail in the following examples.

In general, processor 105 of RF beacon/luminaire 120 controls the other components of the RF beacon/luminaire 120. For example, processor 105 controls RF transceiver 102 to communicate with other devices with compatible RF functionalities. The RF transceiver 102 may also be used by the processor 105 to communicate with the location server 114 if, for example, the wired or wireless medium 199 to communication port 103 is not present.

The processor 105 also controls aspects of operation of the light source 122, such as turning ON/OFF, the light output intensity level, the associated color characteristic(s) of the light output, focus and/or aiming of the light output, and the like. For example, the processor may provide control signals to the light source (e.g. via a driver circuit not shown) to control the output of the light source, such as dimming (i.e. controlling light output intensity level), the color characteristics or the like. Light output from the luminaire source 122 may carry information, such as a code (e.g. to identify the luminaire or its location) or downstream transmission of communication signaling and/or user data, as visible light communications. The light based data transmission may involve modulation or otherwise adjusting parameters (e.g. intensity, color characteristic, or beam shape) of the illumination light output from the source 122.

The location server 114 may also be coupled to the data storage 117. The data storage 117 may be configured to store the received position determination information and the identifying information related to the plurality of radio frequency-enabled devices, such as the RF beacons/luminaires 120 and/or mobile devices 130. Position determination information may be additional information, such as received signal strength indications (RSSI), Doppler measurements, known physical locations of one or more RF-enabled devices or other features, such as nearby landmarks (e.g., end cap displays, aisle-way displays, doorways, water fountains, or the like), visible light communication signals, compass measurements, inertial movement measurements, or the like.

In the example of FIG. 1, the location server 114 is implemented as a server that includes a data communication interface (not shown) for packet data communication (e.g. with the RF beacons/luminaires and other devices) via the particular type of available network such as data network 170 with other devices. The data communication interface 116 may be wired or wireless. For communication with luminaires, like 120, the data communication interface 116 of the server 114 may be similar to or otherwise compatible with the RF wireless communication capabilities of the transceiver 102 of the luminaire(s).

The location server 114 may be a physical server computer on the network that the system 100 is connected to via wireless or wired medium. It could also be implemented as a server instance running in the cloud. Alternatively, the server for the location server 114 could be a processor on one or more of the RF beacon/luminaires 120. In some examples, the location server 114 is implemented in the form of a distributed processing system, e.g. a server program that runs on the processors of some number of RF beacons/luminaires 120.

Some of the RF-enabled devices, such as the RF beacons/luminaires 120 and mobile device 130 as well as the location server 114 may be coupled wirelessly (or wired, but not shown) to a data network 170. The data network 170 may be limited to an indoor location (not shown in this example), or may be a larger wide area network (WAN) covering several indoor locations, or may be the internet, for example.

Figure 2:
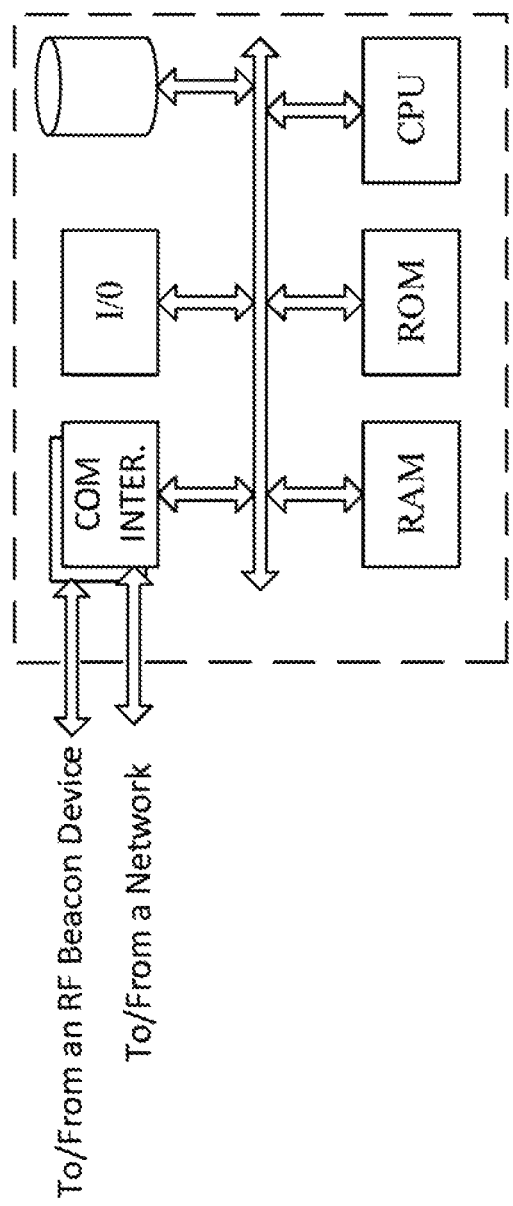
FIG. 2 is a simplified functional block diagram of a computer configured as a server, for example, to function as the location solving server in FIG. 1.

For purposes of further discussion, FIG. 2 shows a computer platform as an example of an implementation of the hardware for a location server configured/programmed as an appropriate server, such as 114 of FIG. 1, or as computer 175 of FIG. 1. The server computer includes a CPU for executing program instructions, such as the appropriate server application program(s). The computer server platform typically includes an internal communication bus, program storage and data storage for various data files to be processed and/or communicated by the server, although the server often receives programming and data via network communications. Of course, the server functions may be implemented in a distributed fashion on a number of similar platforms, to distribute the processing load. Also, a computer configured as a server with respect to one layer or function may be configured as a client of a server in a different layer and/or for a different function. It is believed that those skilled in the art are adequately familiar with the structure, programming and general operation of computer equipment (e.g. 114, 120, 130 or 175), such as that shown in FIG. 1, and as a result, the drawing should be self-explanatory.

The system 100 of FIG. 1 may be utilized for different purposes with regard to the indoor location 180. For example, the system 100 may enable the number of RF beacons/luminaires 120 in the indoor location 180 to be commissioned into a network for control and communication purposes. Commissioning, for example, entails initializing the various electronics within a luminaire such that the electronics are initialized and bought into working condition (i.e. communicating with each other) within a network environment. Any data needed to provision the RF beacon/luminaire 120 for network communication and/or needed to configure the device for luminaire operation. In addition, the locations of each of the RF beacons/luminaires 120 relative to one another are determined for subsequent use, for example, in the commissioning procedure, generation and presentation of an indoor location map or light map, and lighting system control. These features and other advantages of the system 100 will be described in more detail with reference to the examples of FIGS. 3-7.

Deployment of substantial numbers of the RF beacons/luminaires 120 with associated processors 105 and wireless networking RF transceivers 102 involves provisioning those devices 100 and 102 for communication and configuration or commissioning of the RF beacons/luminaires 120 for appropriate operation at the indoor location 180. For some applications, system commissioning may involve the accurate determination of locations of installed lighting devices such as RF beacons/luminaires 120. As noted, one example in which position determination as part of the commissioning process may be significant for implementation is in the case of an indoor location positioning service, which requires accurate location.

As part of a commissioning process, it is beneficial to be able to identify the locations of the elements (e.g. the RF beacons/luminaires 120) that are or will be commissioned into the network environment. The location of each RF beacon/luminaire 120 in the indoor location 180 is determined as a part of the commissioning operation that is typically performed soon after the RF beacon/luminaire is installed. Examples of position determination prior to commissioning, using the RF communication capabilities of the RF beacons/luminaires are described in more detail below. In such an example of an indoor location positioning service, it is desirable for the RF beacons/luminaires 120 or another element in or in communication with the lighting system to know the location of the RF beacons/luminaires 120.

In some examples, an RF beacon/luminaire 120 is configured as a lighting device and is equipped with an RF transceiver 102, the RF beacon/luminaire 120 also is able to communicate with other RF beacon/luminaires 120 and possibly with various other wireless devices in or about the indoor location. The RF transceiver 102 may be a single chip device or system on a chip (SoC) that has the transceiver 102 with the antenna array 136 built in. This is advantageous because the built in (or manufacturer built) antenna array 136 has a correct spacing or tolerances that eliminates small errors in the millimeter spacing of the individual antennas of the antenna array 136 that, if incorrect, may result in large errors at the source or point being measured. The RF transceiver 102 may also include a microprocessor that processes the detected phase differences of the antenna array 136 and outputs an angle of arrival measurement.

Once commissioned, each RF beacon/luminaire 120, whether configured as either a luminaire with RF beacon capabilities or only as an RF beacon, may provide its location and/or a code (e.g., an RF beacon/luminaire identifier) that is unique to the particular RF beacon/luminaire 120) correlated to its location in the RF signal emitted by the RF beacon/luminaire 120. A mobile device or other device, such as another RF beacon/luminaire 120, can receive or look up an accurate RF beacon/luminaire location, which the mobile device or other device uses to obtain an estimate of its own location or position. The location of the mobile device 130 may be determined based on the RF beacon/luminaire location data obtained by the mobile device 130.

Figure 3:
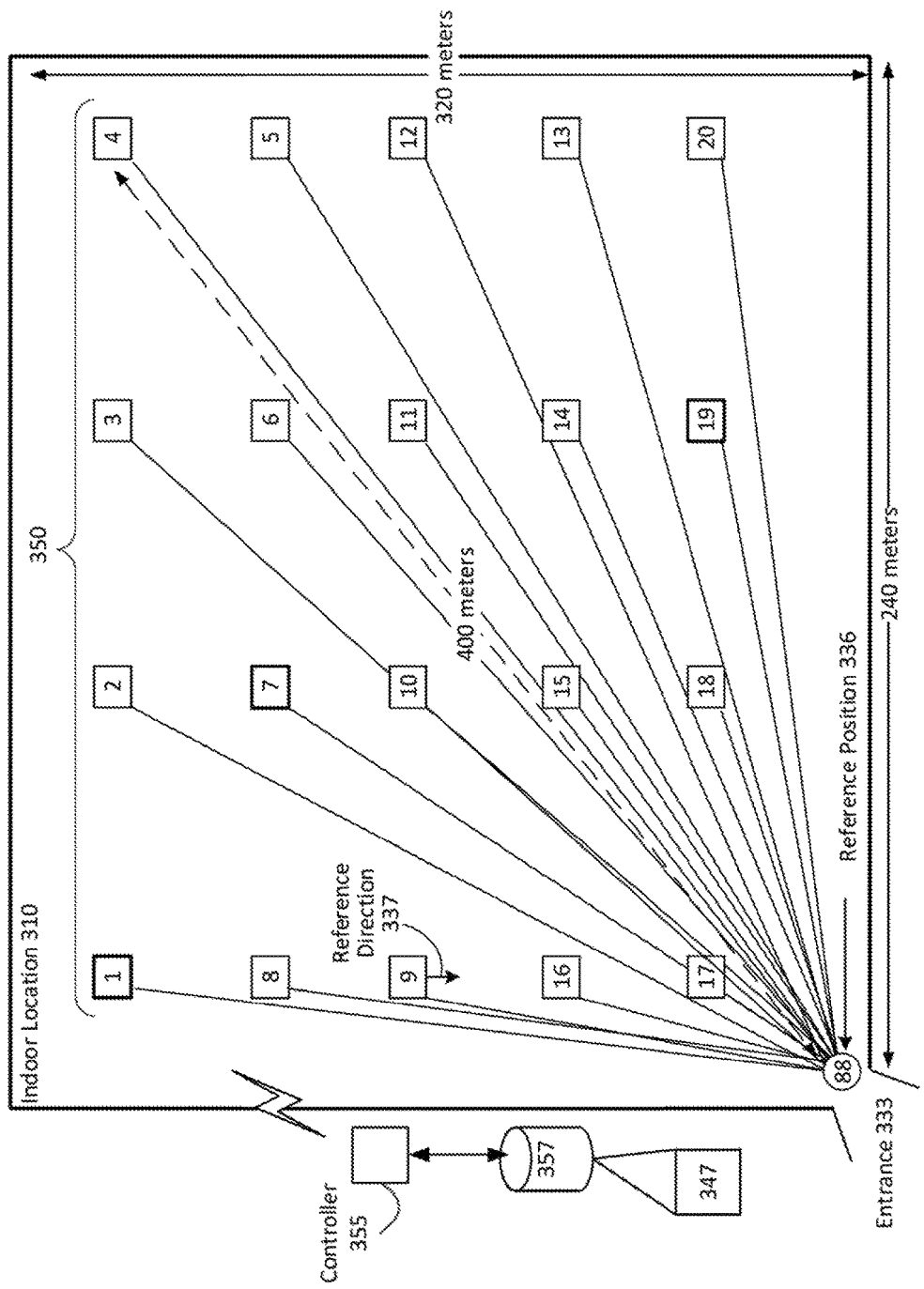
FIG. 3 illustrates an example of an indoor location in which the disclosed system and process examples may be utilized.

More detailed angle of arrival (AoA) measurement examples will be explained with reference to FIGS. 3-7. FIG. 3 illustrates an example of an indoor location in which the disclosed systems and processes may be utilized, and FIG. 4A is a flowchart of an example of a process usable within the example of an indoor location shown in FIG. 3.

In the indoor location example of FIG. 3, an indoor location 310 is illustrated. The indoor location 310 includes an entrance 333 and may have predetermined physical dimensions, such as a width of 240 meters and a length of 320 meters or some other dimensions. Installed within the indoor location may be RF beacons/luminaires 1-20. Each of the RF beacons/luminaires 1-20 may be similar to the RF beacons/luminaires 120 described in the examples of FIG. 1. The RF beacons/luminaires 1-20 are spaced apart within the indoor location 310. The RF beacons/luminaires 1-20 may be shown distributed in a pattern, but the respective RF beacons/luminaires 1-20 may be positioned in smaller groups at arbitrary locations about the indoor location 310.

The RF beacons/luminaires 1-20 may be arranged in a network 350. The network 350 may be a data communication network configured to enable the transmission of data between respective members of the network 350, such as RF beacons/luminaires 1-20, external devices, such as mobile device 88, under control of a controller 355. The controller 355 is coupled to a data storage 357 that may store program instructions for determining positions of respective RF beacons/luminaires 1-20 in the network 350. Position information and other radio frequency-enabled device information may be stored in a data structure 347. The program instructions may configure the server to perform calculations using AoA information and other information related to the RF beacons/luminaires 1-20 or external devices. The network 350 and controller 350 may be configured to perform different functions depending upon the implementation. For example, when the RF beacons/luminaires 1-20 are configured as luminaires, the RF beacons/luminaires 1-20, the controller 350 may be configured to enable the luminaires to communicate with one another and with external devices, such as mobile device 88, and to also control lighting-related functions (e.g., ON/OFF, dimming, diagnostics or the like) as well as communication functions, such as transmitting, may be referred to collectively as lighting network 350. Alternatively, if the RF beacons/luminaires 1-20 are configured as RF beacons, the network 350 may be referred to as a communication network.

In the example of FIG. 3, a mobile device 88 enters, or is brought into, the indoor location 310 through the entrance 333. To determine a frame of reference point for further calculations, the mobile device 88 may determine its location (i.e. a reference position 336) within the indoor location 310. The determination of the mobile device's location may be accomplished using various methods. For example, the mobile device 88 when outside the indoor location may have been using the global positioning system (GPS) to determine or report its location. Between GPS position determinations or upon entering the indoor location, the mobile device 88 may perform a dead reckoning navigation process using mobile device accelerometer sensor data or the like, calculations based on communications with three or more ground-truth RF devices having known physical locations within the indoor location, visible light signals, compass measurements, inertial navigation measurements, user inputs or the like, since the GPS signals may no longer be available. The mobile device location information as well as the reference position 336 may be based on the physical dimensions of the indoor location. The physical dimensions may be, for example, the inside dimensions of the indoor location 310, such as 320 meters and 240 meters, or some other dimension of the indoor location 310.

Alternatively, or in addition, t an indoor positioning system and position determination service may be used to provide indoor positioning or location determination information to the mobile device 88. The mobile device 88, for example, may be configured to determine its location based on radio frequency indoor positioning signals received from an indoor positioning system located within the indoor location 310. The radio frequency indoor positioning signal received from the indoor positioning system is of a different radio frequency than the radio frequency signal transmitted by the mobile device 88 and received by at least three radio frequency-enabled devices, such as radio frequency-enabled devices 1, 7 and 19. Using, for example, an available wireless communication network, such as a WiFi system provided in the indoor location 310, and an available computer application, mobile device 88 may be provided with its location in the indoor location 310 or may be able to determine its own position within the indoor location 310. For example, the available computer application may provide a map of the indoor location and/or a graphical representation that shows the location of the mobile device 88. Alternatively, a user of the mobile device 88 may input, via a graphical user interface provided by the computer application, a coordinate location based on user information, such as a surveyor's mark, ceiling grid spacing or another landmark within the indoor location 310 for use by the computer application. Such a computer application may be programmed using common computer languages such as Python, Objective C, Swift and/or HTML 5. In yet another example, the mobile device 88 may determine the mobile device's location based on a visible light-based indoor positioning signal received at a camera, such as 137 of FIG. 1, of the mobile device 88 from the visible light-based indoor positioning system comprising the located within the indoor location 310.

In response to determining the mobile device's location within the indoor location 310, a mobile device transmitter, such as 132A of mobile device 130 of FIG. 1, broadcasts a radio signal and the transceiver 102 in the RF beacon/luminaire 120 receives the signal broadcast by the mobile device 88. As described above, the transceiver 102 comprises a compound antenna or an antenna array, i.e., an antenna configured in an array of two or more antenna elements, such as 136. In general, and depending on the orientation of the array with respect to the transmitter, the two or more antenna elements may not be the same distance away from the transmitter. Radio waves take slightly different times to travel from the transmitter to each of the receiver's antenna elements. These slight time-of-flight differences, measured as apparent time-shifts of the received radio wave between antenna elements (a.k.a. "phase shifts"), are used to calculate the angle between the receiving antenna array 136 and its line of sight to the transmitter, e.g., 132A—that is, the angle of arrival (AoA) of the received signal. Alternatively, a stationary one-dimensional (linear) antenna array may also be used measure AoA in a plane (two dimensions). A two- or three-dimensional antenna array may be used to measure AoA in three dimensions.

Returning to the example of FIG. 3 with the mobile device 88 positioned at reference position 336, a process such as that outlined in FIG. 4A may commence. FIG. 4A is a flowchart of an example of a process usable within the example of the indoor location shown in FIG. 3.

In the process 400 shown in FIG. 4A, at step 410, the mobile device 88 may transmit a signal that is broadcast to all stationary RF beacons/luminaires 1-20 in the beacon network. The transmitted signal may contain information related to the reference position 336. The respective processors in the respective RF beacons/luminaires 1-20, when executing the stored programming code, are configured to decode the encoded broadcast message to obtain the position determination information of the mobile device within the indoor location. A number of stationary RF beacons/luminaires 1-20 in the beacon network receive the transmitted signal. Since the RF beacons/luminaires 1-20 are configured with the transceiver 102 and antenna array 136, the RF beacons/luminaires 1-20 are able to determine, or measure, an angle of arrival of the received signal. For example, the antenna array coupled to the transceiver 102 in each of the RF beacons/luminaires 1-20 may be oriented such that the respective antennas have a reference direction 337 on which the angle of arrival measurement is based.

At 420, the processor in each of the respective RF beacons/luminaires 1-20 obtains an angle of arrival indication of the received signal at each respective stationary radio frequency-enabled beacon of the number stationary radio frequency-enabled beacons. The angle of arrival indication may be a digital voltage value representative of the angle of arrival of the received mobile device signal as determined by the respective transceivers of each of the respective RF beacons/luminaires 1-20. The respective transceivers of each of the respective RF beacons/luminaires 1-20 may also be configured to make other measurements, such as received signal strength measurements or the like, and output an indication of the other measurements, such as, for example, a received signal strength indication (RSSI). Measurement results may be calculated by the RF receivers, lighting fixtures, or mobile devices, and transmitted to other lighting fixtures, devices or a back end server. Calculations can utilize only AoA measurements. Alternatively, the AoA measurements may be combined with additional information, e.g. received signal strength indications (RSSI), to provide additional information for calculation of the position of the respective RF beacons/luminaires 1-20.

In a specific example with respect to process steps 410 and 420, RF beacons/luminaires 1, 7 and 19 (chosen arbitrarily, any three RF beacons/luminaires may have been selected) may receive the signal transmitted by the mobile device 88 at each of the respective transceivers of the RF beacons/luminaires 1, 7 and 19. The signal(s) transmitted by the mobile device 88 may be compliant with known communication protocols and/or specifications, such as Bluetooth®, or a similar wireless specification. Each transceiver of the respective RF beacons/luminaires 1, 7 and 19 are configured to make the angle of arrival measurement in response to receiving the signal transmitted by the mobile device 88. The respective processors of the RF beacons/luminaires 1, 7 and 19 obtain the respective angle of arrival measurement of the received signal from their respective transceiver.

At step 430 in the process 400, positions of each of the stationary RF beacons/luminaires 1-20 relative to the mobile device 88 are identified based on the respective obtained angle of arrival of the signal received from the mobile device for the particular RF beacon/luminaire. For example, returning to the specific example of RF beacons/luminaires 1, 7 and 19, the respective processors of the RF beacons/luminaires 1, 7 and 19 may be configured to share their respective obtained angle of arrival indications with the other RF beacons/luminaires 2-6, 8-18, and 20, or at least two other RF beacons/luminaires (e.g., in the case of RF beacon/luminaire 1 with RF beacons/luminaires 7 and 19), by transmitting via their respective transceivers, the respective obtained angle of arrival indications. The server, in response to receiving the respective angle of arrival indications, may use, for example, triangulation techniques, trilateration techniques, the Laws of Sines or other trigonometric or geometric rules, to determine the position of the RF beacons/luminaires 1, 7 and 19 in the indoor location relative to the mobile device 88. For example, the server, such as location server 114, may obtain mobile device location information related to a location of the mobile device in the indoor location from the mobile device, an RF beacon/luminaire and/or the data storage.

The server (such as 114 of FIG. 1, but not shown in the example of FIG. 3) may determine a distance from the mobile device to each of the three radio frequency-enabled devices based on the mobile device location information, a respective known height above a floor of the indoor location of each of the three radio frequency-enabled devices, and the angle of arrival indications. The server, using the angle of arrival indications and determined distance, may generate a data structure including locations of each of the three radio frequency-enabled devices relative to one another and relative to the location of the mobile device within the indoor location. The server may determine a distance of the mobile device from the respective RF beacons/luminaires 1, 7 and 19 as well as from RF beacons/luminaires 2-6, 8-18 and 20 by obtaining a height of the mobile device 88 above the floor of the indoor location. The server may normalize a known height of the radio frequency-enabled device, such as the heights of the respective RF beacons/luminaires 1, 7 and 19 by subtracting a height of the mobile device 88 above the floor of the indoor location from the ordinary height of the radio frequency receiver in the indoor location. The ordinary height of the radio frequency receiver in the indoor location may be a height as listed in a lighting map, a standard installation height for a typical indoor location or a custom, individual height for each respective RF beacon/luminaire 1-20. The server uses the normalized known height of the radio frequency receiver as the ordinary height of each of the three radio frequency-enabled devices when determining the distance from the mobile device to each of the radio frequency-enabled devices.

The respective processors of the RF beacons/luminaires 1, 7 and 19 may also receive information, such as respective AoA indications, RSSI, or the like, related to the other RF beacons/luminaires for use in determining the position of the RF beacons/luminaires 1, 7 and 19 as well as RF beacons/luminaires 2-6, 8-18 and 20.

Alternatively, each of the respective RF beacons/luminaires 1-20 may send their respective AoA measurements to a server, a network controller, a gateway or other device, such as the location server 114 of FIG. 1, connected to the RF beacon/luminaire network. For example, the server, such as location server 114 of FIG. 1, that is identifying the positions of the at least three RF beacons/luminaires 1, 7, 19 or more, such as RF beacons/luminaires 1-20, may determine a distance from the mobile device 88 to each of the at least three radio frequency-enabled devices 1, 7 and 19 based on the mobile device 88 location information, such as reference position 336, a respective known height above a floor of the indoor location of each of the three radio frequency-enabled devices, (i.e., RF beacons/luminaires 1-20), the angle of arrival indications and the like. The server using at least the angle of arrival indications and determined distance, may generate the above described data structure. In some examples, the data structure may include locations of each of the three radio frequency-enabled devices relative to one another and relative to the location of the mobile device within the indoor location.

Figure 4B:
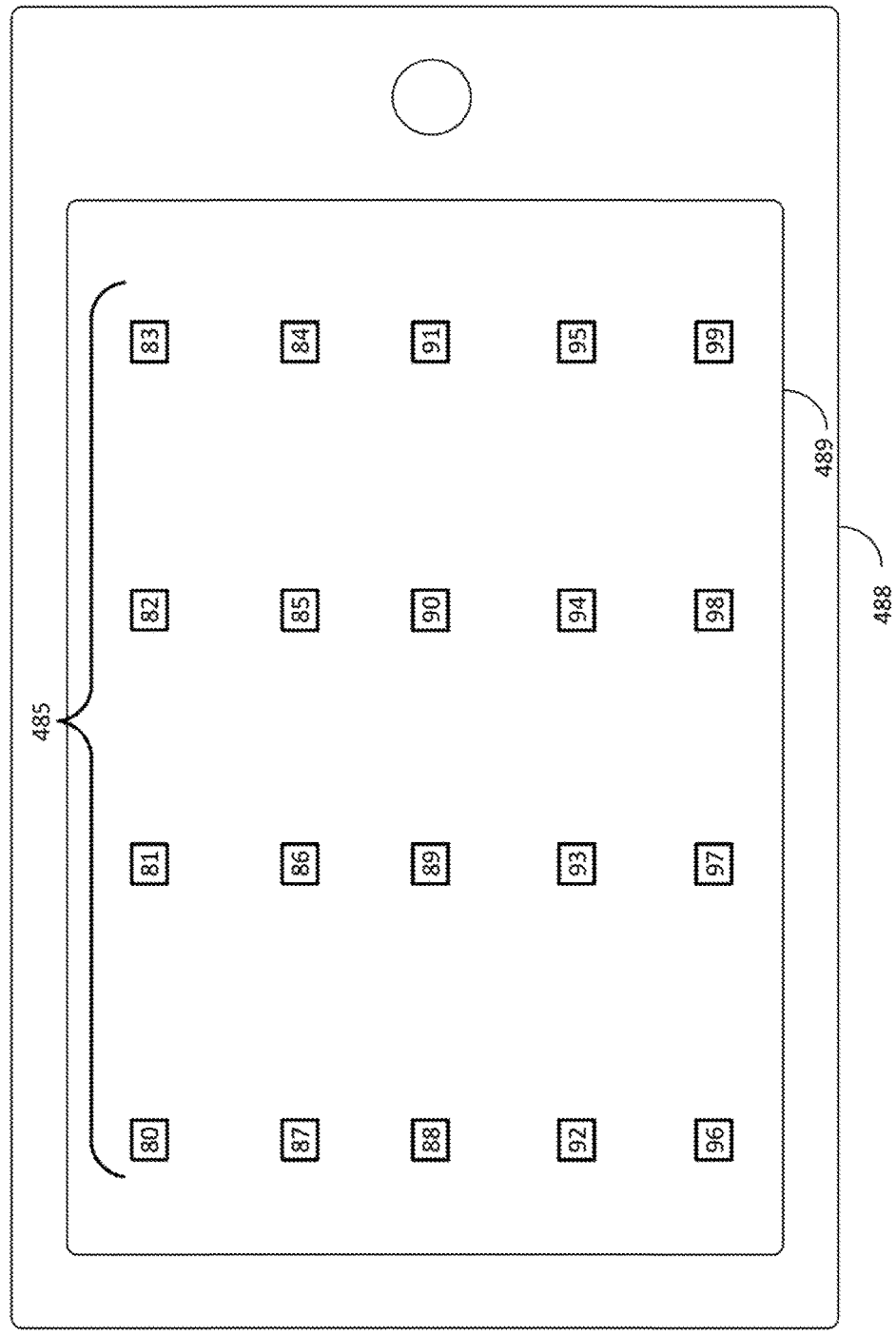
FIG. 4B illustrates an example of a lighting map generated by the process example of FIG. 4A.

Upon identifying their respective positions, an identified position map (also, referred to when the RF beacons are incorporated in luminaires as a "lighting map") may be generated, at 440, by a respective RF beacon/luminaire, e.g., one of RF beacons/luminaires 1-20 that is configured to generate the map, or by the server, such as the location server 114 of FIG. 1, a network controller such as 355 of FIG. 3, a lighting device network gateway or another device, such as mobile device 130. FIG. 4B illustrates an example of an identified position map generated by the process example of FIG. 4A. In the example of FIG. 4B, a device 488 may have a display 489 that presents the identified position map 485 on the device 488. The display 489 may be a touchscreen user interface device that allows a user to interact with the map 485 and the individual RF beacons/luminaires 80-99. Each of the respective RF beacons/luminaires 80-99 may be represented on the display 489 as an icon or other representative symbol.

For example, the identified position map 485 may include data representing the respective identified positions of each of the RF beacons/luminaires 80-99, which may be stored in a data structure 118 maintained in a memory, such as 104 of FIG. 1, of each respective RF beacons/luminaires 1-20. Additional information regarding each of the respective RF beacons/luminaires 80-99 may also be accessible and/or input into the data structure, such as 118 of FIG. 1, via interaction with the individually displayed RF beacons/luminaires 80-99. Alternatively, the data structure 118 may be stored in the data storage 117 of FIG. 1, which is coupled to the location server 114, or mobile device memory, such as 134 of FIG. 1.

Alternatively, the identified position map 485 may be presented as graphical representation of the respective identified positions of each of the RF beacons/luminaires 80-99 on a display 489 of the mobile device 88 or a computing device, such computer 175 of FIG. 1, each of which may be configured to function as device 488.

The identified position map described in the example of FIG. 4A3B may be generated for each of the respective RF beacons/luminaires 1-20 based on the single reference point 336. However, the mobile device 88 may move to other reference points (not shown) at which, the process 400 may be repeated. The mobile device 88 may move to yet another reference point and repeat the process 400. The data from the multiple identified position maps may be processed according to, for example, a data fitting or statistical process to produce a final identified position having the most likely locations of the RF beacons/luminaires 1-20 relative to one another and to the indoor location. The location server 114 may, for example, determine an updated distance from the another location of the mobile device 88 to each of the at least three RF beacons/luminaires 1, 7 and 19, based on the updated mobile device location information, a known height of each of the three radio frequency-enabled devices and the subsequent angle of arrival indication of each of the three radio frequency-enabled devices.

The process 400 of FIG. 4A may enable other features to be provided by the system 100. For example, the generated data structure may be used to produce an enhanced floor plan by aligning or overlaying (via a drag and drop functionality built into the computer application, for example) a graphical representation of the generated data structure with a floor plan of the indoor location to indicate a location of each of the at least three radio frequency-enabled devices, for example, RF beacons/luminaires 1, 7 and 19. The enhanced floor plan may be updated by processor 115 of the location server 114 or another processor, such as 102 in one or more of an RF beacon/luminaire 120 by obtaining a light map of the indoor location from, for example, data storage 117. The light map indicating a location of the three radio frequency-enabled device within the indoor location 180 or 310. The processor, e.g., 100 of FIG. 1, may be configured to compare a graphical representation of the generated data structure to the obtained light map. The comparison may be of coordinates of the respective luminaire coordinates in an electronic version of the light map to the coordinates of the RF beacons/luminaires in the generated data structure. Based on the results of the comparison, the location in the light map of any of the at least three radio frequency-enabled devices 1, 7 and/or 19 that is not positioned according to the generated data structure may be updated and stored. The updated data structure is stored either over the previous data structure or as a new data structure.

Another feature may be the commissioning of respective ones or all of the RF beacons/luminaires 1-20 in a network. For example, upon determining the identified positions of the RF beacons/luminaires 1-20 or at least the identified positions of RF beacons/luminaires 1, 7 and 19, the at least three radio frequency-enabled devices 1, 7 and 19, may be commissioned in a lighting network, such as 350 of FIG. 3 based on the generated data structure including the identified positions or relative locations.

In the example, when commissioning the respective radio-frequency enabled devices, such as the at least three RF beacons/luminaires 1, 7 and 19, coordinates may be generated for each of the at least three radio frequency-enabled devices within the indoor location based on the generated data structure and the mobile device location information. The generated coordinates of each of the three radio frequency-enabled devices may be associated with a respective radio frequency-enabled device identifier, as well as a lighting identifier in the case of a luminaire being associated with an RF beacon, assigned to each of the three radio frequency-enabled devices. The associated coordinates and radio frequency-enabled device identifiers may be stored as commissioning data in a memory or a data storage, such as data storage 117.

FIG. 5A illustrates an example of an indoor location implementation of a network 550 of RF beacons/luminaires in which the RF beacons/luminaires communicate with one another to enable position determination of one another and enable self-commissioning by the respective RF beacons/luminaires in the network 550. While the emissions from each of the respective RF beacons/luminaires are shown as being emitted in a single direction, the signals transmitted by each of the respective RF beacons/luminaires A-T may be transmitted omnidirectionally to provide all of the respective RF beacons/luminaires A-T in the network 550 with the opportunity to receive the transmitted signals.

The system 500 of FIG. 5A includes a number of radio frequency-enabled devices A-T arranged in a network 550 within an indoor location 500, a server 520, a data storage and a data network 570. The radio frequency-enabled devices A-T may be configured in a manner similar to that of RF beacons/luminaires 120 of FIG. 1. For example, each of the number of radio frequency-enabled devices A-T may configured to communicate messages between one another, and/or communicate with a mobile device within the indoor location 500. The server 520 may be wirelessly coupled to the number of radio frequency-enabled devices A-T. Alternatively, the server 520 may be coupled to the number of radio frequency-enabled devices A-T via a wired connection. In this example, the server 520 is configured to receive position determination information and identifying information from the number of radio frequency-enabled devices A-T. Each of the radio frequency-enabled devices A-T may transmit position determination information and identifying information in a signal intended for broadcast to all of the radio frequency-enabled devices A-T in the network. For example, device A may transmit position determination information and identifying information specific to device A to all of the other devices B-T. The data storage 535 is coupled to the server 520. The data storage 535 may be configured to store the received position determination information and the identifying information related to the number of radio frequency-enabled devices A-T, in, for example, a data structure 545.

Each of the number of radio frequency-enabled devices A-T may be similar to RF beacons/luminaires 1-20 of FIG. 1, and may include a processor, a radio frequency transceiver and a memory (not shown in this example). In each respective radio frequency-enabled device A-T, the memory and the radio frequency transceiver are coupled to the processor, and the memory stores programming code executable by the processor. For example, the processor of each of the radio frequency-enabled devices A-T may be configured to perform various functions, examples of which will be described with reference to FIG. 6.

The system 500 may also include a mobile device 515 as another radio frequency-enabled device in the indoor location 510. The mobile device 515 may be configured similar to mobile device 130 of FIG. 1, and may include a radio frequency transceiver, such as 132 of FIG. 1, a processor, such as 100 of FIG. 1, and a memory, such as 134 of FIG. 1. The mobile device 515 may be configured to determine a location of the mobile device 515 in the indoor location 510. The mobile device 515 may transmit, via the mobile device's radio frequency transceiver, a broadcast message for receipt by the number of number of radio frequency-enabled devices A-T. The broadcast message may be encoded with position determination information, which includes information related to a location of the mobile device 515 as determined by the mobile device 515. For example, the position determination information of the mobile device 515 may include a landmark 567 location within the indoor location 510 near to where the mobile device 515 is positioned. Alternatively or in addition, the position determination information of the mobile device 515 includes coordinates of the mobile device 515 within the indoor location 510.

In some examples, the server 520 may be coupled either wirelessly or via a wired connection to the network 550. In such a configuration, the server 520 may control the radio frequency-enabled devices A-T to perform lighting-related (e.g., illuminate areas of the indoor location or the like), RF beaconing-related functions (such as communicating with external devices such as 515) or the like. The system 500 of FIG. 5A may perform additional functions. For example, each of the radio frequency-enabled devices A-T includes a processor. A processor of a respective radio frequency-enabled device of the number radio frequency-enabled devices A-T in the network 515 may be further configured to forward wirelessly to the server 520 via data network 570 a message including an radio frequency-enabled device identifier and the position related information of the other radio frequency-enabled device(s), such as, if the respective radio frequency-enabled device is device A, the other radio frequency-enabled device(s) may be one of B-T, within the indoor location 510.

In other examples, the radio frequency transceiver, such as 132 of FIG. 1, of each of the plurality of radio frequency-enabled devices may be further configured to determine a distance from the radio frequency-enabled device to the mobile device. This determination may be based on the determined angle of arrival indication of the received mobile device signal and a known height of the respective radio frequency-enabled device A-T above a floor of the indoor location 510. The determined distance and the determined angle of arrival may be encoded into the message forwarded to the server 520 as position-related information.

In another example, the server 520 may be configured to use the position related information included in the forwarded message to determine a location of the respective radio frequency-enabled device, e.g., one of A-T, in relation to other radio frequency-enabled devices of the number of radio frequency-enabled devices A-T. The position-related information may include the determined angle of arrival indication of the received signal and the position determination information of the mobile device within the indoor location.

In yet another example, for each radio frequency-enabled device A-T, the server 520 may be further configured to receive a respective message including position-related information from each of the respective radio frequency-enabled devices A-T of the number of radio frequency-enabled devices A-T. The server 520 upon receipt of the respective message from each of the number of radio frequency-enabled devices A-T, may determine a location of each of the plurality of the radio frequency-enabled devices A-T relative to one another.

Alternatively, in another example, the server 520 may be further configured to populate a data structure 545 including the determined location of each radio frequency-enabled device of the number of radio frequency-enabled devices A-T using the determined location of each of the number of the radio frequency-enabled devices A-T relative to one another. The server 520 using the data structure 545 may generate a location map of the number of radio frequency-enabled devices A-T showing the locations of each of the number of the radio frequency-enabled devices in the indoor location. The generated location map and an indoor location identifier may be stored in a data storage such as 117 or 535 for distribution to another mobile device, an indoor position service or a remote computing device.

In the example of FIG. 5A, if appropriately driven arrays are used by both the transmitting device (i.e., one of RF beacons/luminaires A-T transmitting a message) and the receiving device (i.e., another or different one of RF beacons/luminaires A-T that is receiving the message), as may be the case with, for example, stationary RF beacon/luminaire-to-RF beacon/luminaire communication, then AoA and AoD measurements may be made at the same time. If two antenna array-equipped devices, such as two or more of the RF beacons/luminaires A-T, both transmit and receive radio frequency signals, at least four AOA measurements may be made simultaneously: i.e., AoA and AoD for Device A, and the same for Device B. In general, the more measurements that are made, the more accurate the position estimates of each respective RF beacon/luminaire will be. More specifically, AOA measurements from at least three RF beacons/luminaires, such as A, M and R, may be used to calculate not only the angular relationships between devices but the locations of two or more RF beacons/luminaires that are receiving signals and/or RF beacons/luminaires that are transmitting signals.

In an angle of departure (AoD) measurement example, the transmitter (in this example, such as an RF beacon/luminaire 120) comprising the array of antenna elements (e.g. antenna array 136). Transmission of the output signal may be switched rapidly and cyclically among the antenna elements of the array 136, so that each antenna element transmits a short time-slice of the signal before the next antenna element in the array takes over. Since, in general, the antenna elements are at different distances from the receiver, time-of-flight from each antenna element to the receiver is different for each antenna element. These slight time-of-flight differences, measured as apparent time-shifts of sequential portions of the wave detected by the receiving device, such as RF beacon/luminaire A or L) can be used to calculate the angle between the transmitting array and the line-of-sight to the receiving device—that is, the angle of departure (AoD) of the received signal.

In another version of AoD measurement, transmission is not switched between N transmitting antenna elements but occurs continuously on all antenna elements. The receiving RF beacon/luminaire of RF beacons/luminaires A-T may process the received signal to observe a superposition of N waveforms of the same signal, each shifted with respect to the others by an amount that depends on the AoD. The receiving RF beacon/luminaire of RF beacons/luminaires A-T may be configured to process the waveforms, and distinguish these waveforms to determine their phase relationships and thus the AoD.

When both AoA and AoD are obtained by a processor (such as 100 of FIG. 1), the locations of respective RF beacons/luminaires A-T may be determined using AoA alone, AoD alone or the combination of AoA and AoD.

Figure 5B:
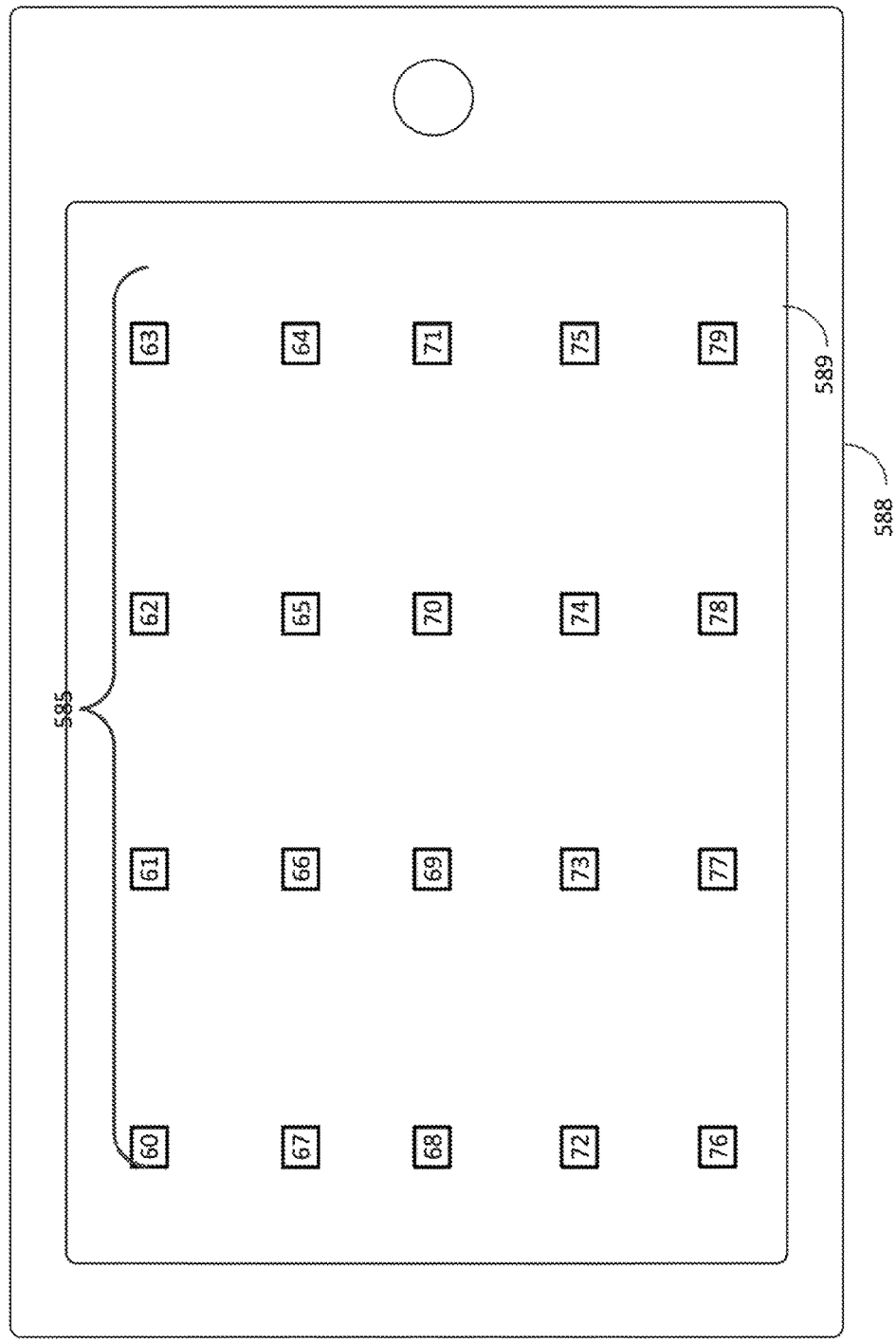
FIG. 5B illustrates an example of a general location map as generated by the processes examples described herein.

FIG. 5B illustrates a general example of a location map, which is also referred to herein as an identified position map. In the example of FIG. 5B, a device 588 may have a display 589 that presents the location map or identified position map 585 on the device 588. The display 589 may be a touchscreen user interface device that allows a user to interact with the map 585 and the individual RF beacons/luminaires 60-79. Each of the respective RF beacons/luminaires 60-79 may be represented on the display 589 as an icon or other representative symbol. The general example of an identified position map 585 may be generated from a data structure, such as data structure 118 described above with reference to the examples of FIGS. 1 and 4B.

FIG. 6 is a flowchart illustrating an example of a process for determining locations of stationary RF beacons/luminaires that communicate with one another within an indoor location.

The process 600 may be implemented by a system such as that described with reference to FIG. 5A. For example, in the system 500 of FIG. 5A a number of the radio frequency-enabled devices A-T may be stationary RF beacon configured to implement the process 600. For example, in the process 600, a radio frequency-enabled device, such as A or 515 of FIG. 5A may receive a signal, at 610, from each of a number of stationary radio frequency-enabled beacons, such as B-T or A-T, respectively. Alternatively, the radio frequency-enabled device that implements the process 600 may be a luminaire coupled to one of the number of stationary radio frequency-enabled beacons. At 620, a processor coupled to the radio frequency-enabled device obtains an angle of arrival of each respective signal received from each respective stationary radio frequency-enabled beacon of the number of stationary radio frequency-enabled beacons. The positions of the stationary radio frequency-enabled beacons in the indoor location relative to the radio-frequency-enabled device are identified, at 630, based on the determined angle of arrival of each respective signal received from each respective stationary radio frequency-enabled beacon. Using the identified positions of the number of stationary radio frequency-enabled beacons in the indoor location, a location map is generated using the identified positions of the number of stationary radio frequency-enabled beacons in the indoor location (640). The generated location map, or identified position map, such as 585 of FIG.

5B, may illustrate locations of the number of stationary radio frequency-enabled beacons, such as 60-79 of FIG. 5B, relative to one another in the indoor location.

The location map generated at 640, may be generated, for example, by incorporating a position of the mobile device into the location map. The position of the mobile device may be shown in the location map relative to the location of the number of stationary radio frequency-enabled beacons. For example, the location map may resemble the indoor space 510 layout with radio frequency-enabled beacons, such as A-T and mobile device 515.

The process of FIG. 6 may be modified, for example, such that steps 610 and 620 may be performed more specifically, upon receiving a signal from another radio frequency-enabled device of the plurality of radio frequency-enabled devices, an angle of arrival indication of the received signal is obtained. In addition, optional steps such obtaining position determination information of the another radio frequency device from the received signal may be performed. In which case, position related information of the other radio frequency-enabled device may be generated based on the determined angle of arrival indication and the position determination information.

FIG. 7 is a flowchart illustrating another example of a process for determining locations of stationary RF beacons/luminaires that communicate with one another within an indoor location. The process 700 may alternatively be performed by each stationary radio frequency-enabled beacon/luminaire of a number of stationary radio frequency-enabled beacons/luminaires A-T. The respective number of stationary radio frequency-enabled beacons/luminaires A-T may be implemented in a system that also includes a location server.

The process 700 may begin at 710 by receiving, by the respective radio frequency-enabled beacon, respective signals from a number of the other stationary radio frequency-enabled beacons A-T. At 720, a processor coupled to the radio frequency-enabled beacon may obtain an angle of arrival of each respective signal received from each respective stationary radio frequency-enabled beacon of the number of the other stationary radio frequency-enabled beacons A-T by the respective radio frequency-enabled beacon. The positions of the other stationary radio frequency-enabled beacons in the indoor location may be identified, at 730, relative to the radio-frequency-enabled beacon based on the obtained angle of arrival of each respective signal received from each respective stationary radio frequency-enabled beacon of the other stationary radio frequency-enabled beacons. After identifying positions, a location map, or identified position map, such as 585 of FIG. 5B, using the identified positions of the stationary radio frequency-enabled beacons in the indoor location may be generated (740).

The various examples disclosed herein relate to utilizing AoA and/or AoD measurements of transmitted signals to create a location map of the network of RF beacons/luminaires A-T in network within an indoor environment. In addition, the utilization of AoA and/or AoD in the commissioning of a network of RF beacons/luminaires A-T reduces errors, enables generation of graphical location maps, permits confirmation of indoor location physical structure configurations, and/or the like.

Commissioning of lights may be performed by placing a receiving device (radio-frequency (RF) "receiver" such as RF beacons/luminaires 1-20 of FIG. 3) at, for example, at least three locations having a known reference position (e.g., known latitude and longitude, known grid position or the like) within the indoor location. The commissioning process utilizes the locations of the RF beacons/luminaires 1-20 and the at least three locations with known reference positions. For example, the commissioning of the three RF beacons/luminaires 1, 7 and 19 of FIG. 3 may be completed based on the generated data structure of relative locations of the RF beacons/luminaires 1-20. The commissioning process is simple and efficient for all types of indoor environments and ceiling types. Due to the use of radio frequency communication, the receiver locations do not have to be visible to a human operator or optical recognition-capable commissioning device.

An advantage provided by the described system for indoor position determination utilizing a mobile receiver is that the AOA measurements can be made from multiple points and then combined by, for example, triangulation, trilateration or other technique, to identify highly accurate locations of RF beacons, and any luminaires co-located with the particular RF beacon.

In an alternative example, rapid commissioning of a number of stationary RF beacons/luminaires into an indoor positioning system may be accomplished by determining the location of an antenna array-equipped mobile device with respect to a number of stationary receiving devices, such as RF receivers/luminaires 1-20 or A-T. In the example, a mobile device begins receiving signals from the number of stationary receiving devices. The mobile device may have a transceiver and/or a processor configured to determine an AoA or AoD of the signals received by the respective receiving devices. The AOA data is used to identify the relative positions of the stationary receivers as the mobile device moves about the indoor location. Upon comparing AOA measurements of the collected data at the mobile device's respective locations in the indoor location to a map of the indoor location, the system may generate an indoor location map of the locations of the receivers.

In an alternative commissioning example, the map generated at 440 of FIG. 4A based on the data obtained from the number of stationary RF receivers/luminaires 1-20 of FIG. 3 or A-T of FIG. 5A may be used for commissioning. In the commissioning example, the AOA data and the position of the mobile device is used to identify the relative positions of each of the stationary RF receivers/luminaires relative to the mobile device and to each other as the mobile device moves from one known position to another within the indoor location. Upon comparing AOA measurements of the collected data related to a lighting map of the indoor location, the system may commission the RF receivers/luminaires 1-20 or A-T in the network.

In an alternative indoor positioning example, when used in a commissioned system where RF beacon/luminaire locations are already known, the location of a mobile device can be precisely determined by making AOA measurements of signals exchanged by the mobile device and some number of RF receivers.

In a typical application of the systems 300 and 500, an RF receiver/luminaire system needs to be commissioned, that is, the precise locations of the receivers need to be determined. Usually a human operator walks about the space carrying a mobile receiver device ("mapper") equipped with a software application capable of identifying specific receivers with location coordinates based on a number of AOA measurements and/or other informational inputs. Alternatively, measurements are transmitted by the mobile device to a server, such as 114 or 520 that performs the calculations. For example, the user walks about the store while the mobile device collects AOA measurements for RF beacons co-located with luminaires in the ceiling.

Alternatively or additionally, the RF beacons perform AOA measurements and perform locational calculations or transmit measurements to the mobile device, a back end server, or some other destination, such as computer 175.

Examples of the computer application software capabilities in addition to providing a graphical representation of RF beacon/luminaire locations within an indoor location, may also be configured to present on a display device (such as I/O 139 of mobile device 130 of FIG. 1, or display of computer 175 of FIG. 1) a route that the user should attempt to follow, or a region the user should traverse, to obtain needed AoA or AoD measurements to complete a position determination process or commissioning process. For example, the computer application may indicate on a display device or to the user when enough measurements have been accumulated to estimate the locations of all the receivers to within an acceptable accuracy, whereupon the commissioning process can end.

An end product of this commissioning process is a "light map," also referred to as an location map or identified positon map, such as, for example, those shown in FIGS. 4B and 5B, or a table representation of data structure 118, that specifies the locations of the RF receivers in luminaires (and possibly other RF receivers) in the indoor location. The location information may be 2- or 3-dimensional. The location information may be presented on a display device of mobile device 130 or computer 175.

In an already commissioned system where RF receiver locations are already known, the location of a mobile device can be precisely determined by making AOA measurements of signals exchanged by the mobile device and some number of RF receivers.

Aspects of the methods of the exemplary system, apparatus and method outlined above may be embodied in programming, e.g. in the form of software, firmware, or microcode executable by a user computer system, a server computer, such as a location server, or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software, such as position determination application from one computer or processor into another, for example, from a management server or host processor into the memory 320 of the set top box 311. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-transitory storage media include, for example, optical or magnetic disks, such as any of the storage devices in any computer(s) or the like. It may also include storage media such as dynamic memory, for example, the main memory of a machine or computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is ordinary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Each of the various couplings may be considered a separate communications channel.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by three radio frequency-enabled devices located within an indoor location of which at least one of the three radio frequency-enabled devices is configured as a luminaire, a radio frequency signal transmitted by a mobile device within the indoor location, the radio frequency signal including a mobile device identifier, wherein:
     each of the three radio frequency-enabled devices receiving the radio frequency signal at an array of antennas;
   obtaining, by a processor of each respective one of the three radio frequency-enabled devices, an angle of arrival indication determined based on the radio frequency signal received via the array of antennas of the respective one of the three radio frequency-enabled devices;
   forwarding, by the processors of the three radio frequency-enabled devices, the obtained angles of arrival indications to a server;
   obtaining, by the server, mobile device location information related to a location of the mobile device in the indoor location;
   determining, by the server, a distance from the mobile device to each respective one of the three radio frequency-enabled devices based on the mobile device location information, a respective known height above a floor of the indoor location of each respective one of the three radio frequency-enabled devices, and the obtained angle of arrival indications; and
   using the angle of obtained arrival indications and determined distances, generating a data structure including locations of the three radio frequency-enabled devices relative to one another and relative to the location of the mobile device within the indoor location.

2. The method of claim 1, further comprising:
   commissioning the three radio frequency-enabled devices in a lighting control network based on the generated data structure including the locations of the three radio frequency-enabled devices relative to one another and relative to the location of the mobile device within the indoor location.

3. The method of claim 2, wherein commissioning comprises:
   generating coordinates for each of the three radio frequency-enabled devices within the indoor location based on the generated data structure and the mobile device location information;
   associating the generated coordinates of each of the three radio frequency-enabled devices with a respective radio frequency-enabled device identifier assigned to each of the three radio frequency-enabled devices; and
   storing the associated coordinates and radio frequency-enabled device identifiers as commissioning data in a memory.

4. The method of claim 1, wherein the mobile device location information is based on the physical dimensions of the indoor location.

5. The method of claim 4, wherein the physical dimensions are inside dimensions of the indoor location.

6. The method of claim 1, wherein the mobile device location information forwarded by the mobile device indicates the location of the mobile device when the mobile device was transmitting the radio frequency signal.

7. The method of claim 1, further comprising:
   producing an enhanced floor plan by aligning a graphical representation of the generated data structure with a floor plan of the indoor location to indicate the location of each of the three radio frequency-enabled devices.

8. The method of claim 1, further comprising:
   obtaining a light map of the indoor location, the light map indicating locations of the three radio frequency-enabled devices within the indoor location;
   comparing the generated data structure locations to the obtained light map locations; and
   based on the results of the comparison, updating the location indicated in the light map for any of the three radio frequency-enabled devices that is not positioned according to the generated data structure.

9. The method of claim 1, further comprising:
   moving the mobile device to another location within the indoor location;
   receiving at the three radio frequency-enabled device, a subsequent radio frequency signal transmitted by the mobile device from the another location within the indoor location;
   obtaining, by the processor of each of the three radio frequency-enabled device, a respective subsequent angle of arrival indication determined based on the subsequent radio frequency signal received by the respective antenna array of each of the three radio frequency-enabled device;

forwarding, by each respective processor of the three radio frequency-enabled device, the obtained subsequent angle of arrival indication to the server;

forwarding, by the mobile device, updated location information of the mobile device to the server, the updated location information indicating the mobile device's move to the another location in the indoor location;

determining, by the server, an updated distance from the another location of the mobile device to each of the three radio frequency-enabled devices, based on the updated mobile device location information, the known height of each of the three radio frequency-enabled devices and the subsequent angle of arrival indication of each of the three radio frequency-enabled devices; and updating the data structure based on the updated mobile device location and the updated distance from the another location of the mobile device.

10. The method of claim 1, wherein the radio frequency signals transmitted by the mobile device are compliant with the Bluetooth low energy specification.

11. The method of claim 1, wherein obtaining by the server mobile device location information related to a location of the mobile device in the indoor location, comprises:

forwarding, by the mobile device, the mobile device location information to the server.

12. The method of claim 1, wherein the radio frequency-enabled device is coupled to a lighting device, and the method further comprises:

providing control signals to a light source by the processor.

* * * * *